US011760509B1

(12) United States Patent
Hausgen et al.

(10) Patent No.: US 11,760,509 B1
(45) Date of Patent: Sep. 19, 2023

(54) SYSTEM AND METHOD IMPROVING SATELLITE CAPABILITY THROUGH POWER SHARING

(71) Applicant: Government of the United States as represented by the Secretary of the Air Force, Kirtland AFB, NM (US)

(72) Inventors: Paul E. Hausgen, Albuquerque, NM (US); David M. Wilt, Albuquerque, NM (US)

(73) Assignee: Government of the United States as represented by the Secretary of the Air Force, Kirtland AFB, NM (US)

( * ) Notice: Subject to any disclaimer, the term of this patent is extended or adjusted under 35 U.S.C. 154(b) by 876 days.

(21) Appl. No.: 16/550,580

(22) Filed: Aug. 26, 2019

(51) Int. Cl.
| | |
|---|---|
| B64G 1/42 | (2006.01) |
| B64G 1/10 | (2006.01) |
| B64G 1/26 | (2006.01) |
| H04B 7/19 | (2006.01) |
| H04B 7/185 | (2006.01) |
| B64G 1/24 | (2006.01) |

(52) U.S. Cl.
CPC ........... B64G 1/428 (2013.01); B64G 1/1085 (2013.01); B64G 1/242 (2013.01); B64G 1/26 (2013.01); H04B 7/1855 (2013.01); H04B 7/18521 (2013.01); H04B 7/19 (2013.01)

(58) Field of Classification Search
CPC ...... B64G 1/428; B64G 1/1085; B64G 1/242; B64G 1/26; H04B 7/18521; H04B 7/1855; H04B 7/19
See application file for complete search history.

(56) References Cited

U.S. PATENT DOCUMENTS

| | | | | |
|---|---|---|---|---|
| 4,305,555 | A | | 12/1981 | Davis |
| 4,415,759 | A | | 11/1983 | Copeland et al. |
| 5,685,505 | A | * | 11/1997 | Meckler ................ B64G 1/428 |
| | | | | 244/172.7 |

(Continued)

FOREIGN PATENT DOCUMENTS

| | | | | |
|---|---|---|---|---|
| CA | 2897803 A1 | * | 8/2014 | .......... G01S 13/955 |
| WO | WO-0204977 A2 | * | 1/2002 | .......... G01S 19/09 |
| WO | WO-2014121197 A2 | * | 8/2014 | .......... G01S 13/955 |

OTHER PUBLICATIONS

King et al., "Small Satellite LEO Maneuvers with Low-Power Electric Propulsion", Proceedings of the 44th AIAA/ASME/SAE/ASEE Joint Propulsion Conference & Exhibit, Hartford, CT., Jul. 2008, pp. 1-8.

(Continued)

*Primary Examiner* — Donald J Wallace
*Assistant Examiner* — Jalal C Coduroglu
(74) *Attorney, Agent, or Firm* — David L. Narciso; AFNWC/JA

(57) ABSTRACT

In accordance with various embodiments of the disclosed subject matter, a system and method is configured for scheduling and invoking power sharing among satellites within a constellation of satellites such that energy storage systems at a target satellite may by charged prior to the use of electric propulsion thrust activation or other high electricity demand operations (or such operations contemporaneously augmented) by power beams transmitted from other (source) satellites within the constellation.

15 Claims, 5 Drawing Sheets

(56) References Cited

U.S. PATENT DOCUMENTS

| | | | | |
|---|---|---|---|---|
| 6,157,621 | A * | 12/2000 | Brown | H01Q 15/02 370/310 |
| 6,534,705 | B2 | 3/2003 | Berrios et al. | |
| 7,247,953 | B1 * | 7/2007 | Schmulewitz | F22B 1/006 290/1 R |
| 9,150,312 | B2 * | 10/2015 | Ellinghaus | B64G 1/244 |
| 10,454,565 | B2 * | 10/2019 | Pellegrino | H03F 1/0261 |
| 11,203,447 | B1 * | 12/2021 | Holmes | B64G 1/427 |
| 2002/0008101 | A1 * | 1/2002 | Hauschulz | G05D 23/1934 219/535 |
| 2003/0098057 | A1 * | 5/2003 | Mizuno | B64G 1/428 136/244 |
| 2003/0181159 | A1 * | 9/2003 | Heinerscheid | H04H 20/51 455/12.1 |
| 2003/0192586 | A1 * | 10/2003 | Takada | H02J 7/025 136/244 |
| 2006/0038083 | A1 * | 2/2006 | Criswell | H02J 50/50 244/172.7 |
| 2010/0289342 | A1 * | 11/2010 | Maness | H04B 10/118 356/213 |
| 2012/0153744 | A1 * | 6/2012 | Criswell | B64G 1/428 307/104 |
| 2013/0118550 | A1 * | 5/2013 | Sahin | B64G 1/428 307/104 |
| 2013/0259186 | A1 * | 10/2013 | Zauderer | F02K 9/42 376/318 |
| 2014/0105100 | A1 * | 4/2014 | Tronc | H04B 7/195 370/321 |
| 2015/0156734 | A1 * | 6/2015 | Touret | B64G 1/428 244/172.7 |
| 2016/0011318 | A1 * | 1/2016 | Cohen | G01S 19/48 342/357.68 |
| 2016/0056321 | A1 * | 2/2016 | Atwater | H01L 31/0687 136/246 |
| 2016/0094288 | A1 * | 3/2016 | Krebs | H04H 20/91 |
| 2016/0278063 | A1 * | 9/2016 | Zhang | B64G 1/244 |
| 2016/0380486 | A1 * | 12/2016 | Hajimiri | B64G 1/428 307/104 |
| 2017/0126459 | A1 * | 5/2017 | Dutronc | H04L 27/2639 |
| 2019/0044949 | A1 * | 2/2019 | Bartfai-Walcott | H04W 12/63 |
| 2019/0215058 | A1 * | 7/2019 | Smyth | H04B 7/18502 |

OTHER PUBLICATIONS

Martinez-Sanchez et al., "Spacecraft Electric Propulsion—An Overview", Journal of Propulsion and Power, vol. 14, No. 5, Sep.-Oct. 1998, pp. 688-699.

Goebel et al., "Fundamentals of Electric Propulsion: Ion and Hall Thrusters", JPL Space Science and Technology Series, available at https://descanso.jpl.nasa.gov/SciTechBook/series1 Goebel_cmprsd_opt.pdf, Mar. 2008, pp. 1-493.

Barnhard et al., "Space-to-Space Power Beaming (SSPB)—A Commercial ISS Technology Development, Demonstration, and Deployment (TD3) Mission", AIAA Space Forum & AIAA Space and Astronautics Forum and Exposition, Orlando, FL, Sep. 12-14, 2017, pp. 1-33.

Dankanich et al., "Space-to-Space Power Beaming Enabling High Performance Rapid Geocentric Orbit Transfer", 61st AIAA/SAE/ASEE Joint Propulsion Conference, AIAA Propulsion and Energy Forum, (AIAA 2015-4079) https://doi.org/10.2514/6.2015-4079, pp. 1-11.

* cited by examiner

SYSTEM AND METHOD IMPROVING SATELLITE CAPABILITY THROUGH POWER SHARING

GOVERNMENT INTEREST

The invention described herein may be manufactured and used by or for the Government of the United States for all governmental purposes without the payment of any royalty.

FIELD OF THE DISCLOSURE

The present disclosure relates to satellite systems in general and, more particularly, to systems and method for improving the capability of satellites within a constellation of satellites by sharing power there between.

BACKGROUND

It is well known that electric propulsion for spacecraft offers substantial mass savings (reduced propellant) compared to chemical propulsion based systems to achieve the same change in spacecraft velocity. Because of this advantage, electric propulsion has been adopted and applied to spacecraft by multiple entities. However, there is a major disadvantage of electric propulsion, which is the fact that the outstanding propellant efficiency comes at the price of substantially lower spacecraft acceleration than can be achieved with chemical propulsion. The lower spacecraft acceleration capability increases the time to achieve desired changes in orbital velocity (orbit changes), which can be unpalatable for certain operational requirements.

The spacecraft acceleration produced by electric propulsion has a direct functional relationship to the spacecraft specific power (defined as the ratio of the electric power applied to the electric thruster divided by the total spacecraft mass). Therefore, if one can conceive of a methodology to increase the spacecraft specific power of an electric propulsion driven spacecraft, one can increase the spacecraft acceleration produced by the electric propulsion. Increasing the spacecraft acceleration then decreases the time to achieve a prescribed change in spacecraft velocity. The old method of applying electric propulsion generally limits the source of the power being supplied to the electric propulsion system to that which is generated onboard the thrusting satellite. This approach severely limits the satellite acceleration that can be achieved using electric propulsion, which causes orbit changes to be very slow. The current invention provides a methodology to substantially increase the spacecraft specific power such that the major disadvantage of electric propulsion, which is low acceleration, is markedly overcome.

SUMMARY OF THE INVENTION

Various deficiencies in the prior art are addressed below by the disclosed systems, methods, architectures, mechanisms, apparatus and the like for scheduling and invoking power sharing among satellites within a constellation of satellites such that a target satellite may contemporaneously use the received power to augment power supplied to electric propulsion thrusters, or any other high electricity demand operations. Alternatively, the target satellite can store the received energy, or portions thereof, in onboard energy storage systems to meet future expected power needs.

A system according to one embodiment comprises a constellation of earth orbiting satellites; wherein at least some of the satellites include an electric-driven propulsion (EP) system and a power receiver configured to convert received power beams into electricity for use by the EP system; wherein at least a some of the satellites include a power transmitter configured to generate a power beam and transmit the generated power beam toward a target satellite; wherein an orbital maneuver of a target satellite is supported by one or more satellites transmitting power beams toward the target satellite while the target satellite activates its EP system to generate thrust and its power receiver to generate electricity to augment the ability of the EP system to generate thrust. The EP systems may be sized to necessitate the generation of augmented thrust via received power beams; the constellation of earth orbiting satellites comprises a plurality of satellites of similar power level; the power beams comprise laser power beams, and the power receivers comprise photovoltaic systems; the power beams comprise microwave power beams, and the power receivers comprise rectennas. A power beam schedule may be determined for each target satellite prior to a respective scheduled EP thrust activation or other high electricity demand operation, the power beam schedule identifying for each target satellite one or more power sourcing satellites to provide power for the target satellite, and one or more predetermined time periods for each of the power sourcing satellites to provide power to the target satellite. Other modifications are contemplated.

A satellite according to an embodiment may comprise an electric-driven propulsion (EP) system configured to generate thrust; a power receiver configured to convert received power beams into electricity for augmenting thrust generated by the EP system; and a controller, configured to synchronize an orbital maneuver of the satellite utilizing thrust generated by the EP system to a receiving of one or more power beams; wherein the satellite is included within a constellation of satellites orbiting the earth, and the one or more power beams received from one or more power sourcing satellites within a constellation of satellites; and wherein power beams are received in accordance with a power beam schedule determined prior to a scheduled EP thrust activation, the power beam schedule identifying the one or more power sourcing satellites and one or more predetermined time periods for each of the power sourcing satellites to provide power. Other modifications are contemplated.

Additional objects, advantages, and novel features of the invention will be set forth in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
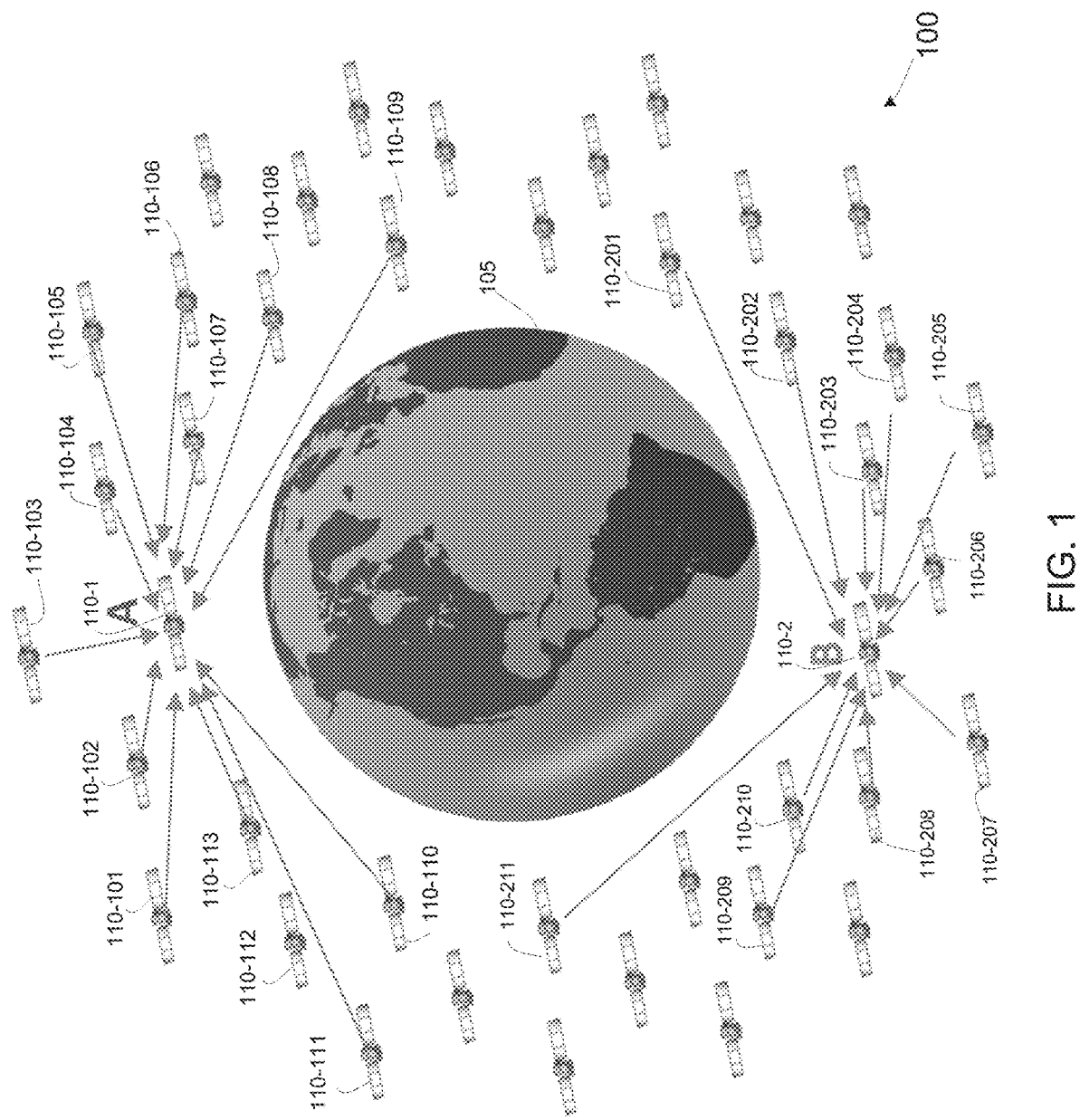
FIG. 1 graphically depicts a satellite constellation benefitting from various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventors to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments improve the capability (e.g., maneuverability) of satellites within a constellation of satellites so as to maximize the value of the constellation of satellites. For example, various embodiments contemplate optimizing energy storage and propellant use associated with electric driven propulsion systems for a target satellite by directing power to the target satellite from other (source) satellites in the constellation. In this manner improved capability/maneuverability (e.g., total velocity change, and propellant use efficiency) of a constellation of satellites is provided to increase utility of a satellite constellation by enabling more frequent, advantageous positioning of individual satellites in the constellation to maximize performance metrics (e.g. ground observation coverage, communication and broadcast coverage); extend constellation lifetime by increasing total velocity change capability of the constellation; and reduce launch cost, and secure easier space access by lowering total satellite mass (lower propellant mass needed to achieve operational requirements)

Various embodiments discussed herein comprise, illustratively, systems, methods, architectures, mechanisms, apparatus, computer implemented methods and/or frameworks configured for, illustratively, increasing the ratio of total delta velocity change capability to propellant mass of a system comprising of a plurality of earth orbiting satellites in a constellation, such as a plurality of satellites of comparable sizes and power levels where each satellite is equipped with power transmit capability (e.g. laser, microwave) and power receive capability compatible with its transmit capability (e.g. photovoltaics, rectennas), and an electric-driven propulsion system (e.g. Hall Effect, Ion, Electrospray, etc.).

By periodically transmitting power from other satellites in the constellation to a target satellite within the constellation, a temporary step increase in the ratio of satellite power per total satellite mass is enabled; that is, the target satellite may operate its electric propulsion subsystem while receiving transmitted (augmented) power to enable increased efficiency of propellant use (high delta velocity to propellant mass ratio) by its onboard electric propulsion system. Further, various embodiments provide a mechanism for increasing spacecraft accelerating (thrust) capability at a fixed specific impulse of an electric-driven propulsion system (e.g. Hall Effect, Ion, etc.) installed on a satellite within the constellation.

FIG. 1 graphically depicts a satellite constellation benefitting from various embodiments. Specifically, FIG. 1 depicts a constellation 100 of satellites 110 orbiting the Earth 105, wherein each satellite 110 within the constellation 100 of satellites is equipped with an electric-driven propulsion (EP) system configured for generating thrust sufficient to move the satellite within the constellation satellites, a power transmitting system configured to beam or transmit power toward other satellites 110 and a power receiving system configured to receive power transmitted or beamed from other satellites 110 (i.e., satellites 110 are configured to share power with each other).

The power transmitting and receiving systems may be configured to transmit/receive laser energy/power, microwave energy/power and the like. In the case of laser power, each satellite in the constellation is equipped with a power transmitting system comprising one or more lasers capable of generating laser power and directing that laser power toward another satellite in the constellation, as well as a power receiving system comprising photovoltaic devices configured to efficiently receive incident laser power from multiple other satellites in the constellation and convert this into electrical power. In the case of microwave power, each satellite in the constellation is equipped with a power transmitting system comprising microwave transmitters capable of generating microwave power and directing that microwave power toward another satellite in the constellation, as well as a power receiving system comprising a microwave receiver (e.g., a rectenna) configured to efficiently receive incident microwaves from multiple other satellites in the constellation and turn this into electric power.

Referring to FIG. 1, a first satellite 110-1 is depicted as receiving power (e.g., laser, microwaves and the like as indicated by the arrows) transmitted from each of a first plurality of power transmitting satellites 110-101 through 110-113, and a second satellite 110-2 is depicted as receiving power transmitted from each of a second plurality of power transmitting satellites 110-201 through 110-211. Thus, at the particular moment in time represented by the operation depicted in FIG. 1, the first 110-1 and second 110-2 satellites are receiving power from respective groups of satellites such that enhanced thrust via the respective electric propulsion systems may be utilized. That is, a power transfer process between satellites is provided wherein, illustratively, based on the number of satellites in the constellation and mission parameters, each satellite would take its turn receiving power from multiple other satellites in the constellation such that its spacecraft specific power (power delivered to electric-driven thrusters divided by spacecraft total mass, W/kg) would experience a substantial step increase.

The various embodiments are not simply satellite to satellite power beaming per se, but a mechanism of equipping an entire constellation of satellites with power beaming and receiving capability to share power among members of a constellation of satellites in conjunction with electric propulsion. One aspect of the embodiments described herein is implementing the power beaming in a constellation of similarly sized satellites that are all equipped with power transfer capability and electric propulsion.

Generally speaking, power transmitting satellites are configured to transmit power to a target satellite contemporaneously with the target satellite requiring augmented thrust from its electric-driven propulsion system such as to perform an orbital maneuver of some type. In other scenarios, power transmitting satellites are configured to transmit power to a target satellite to increase and/or maximize target satellite energy storage levels (e.g., battery charge levels, super capacitors, flywheels etc.) prior to and/or during target satellite use of its EP system or other high electricity demand operations (e.g., such as operating a power-hungry payload and the like). In various embodiments, beamed power may coordinated for use in augmenting various spacecraft activities such as communications, data processing, energy storage and the like. In various embodiments, received beamed power may be directly converted into thermal energy (e.g., such as for thermal rocket propulsion).

As discussed below with respect to FIG. 3, in various embodiments a power beam schedule may be determined for a target satellite prior to a scheduled high electricity demand operation by the target satellite, the power beam schedule comprising at least an identification of power sourcing satellites selected to provide power for the target satellite at one or more predetermined times and an amount of power to be provided by the power sourcing satellites during the predetermined times. The predetermined times may comprise pre-operational time periods during which target satellite energy storage levels are increased via received power beam(s), operational time periods during which target satellite power used for high electricity demand operations is augmented by contemporaneously received power beans(s), and/or post-operational time periods during which target satellite energy storage levels are restored or otherwise replenished via received power beam(s).

Figure 2:
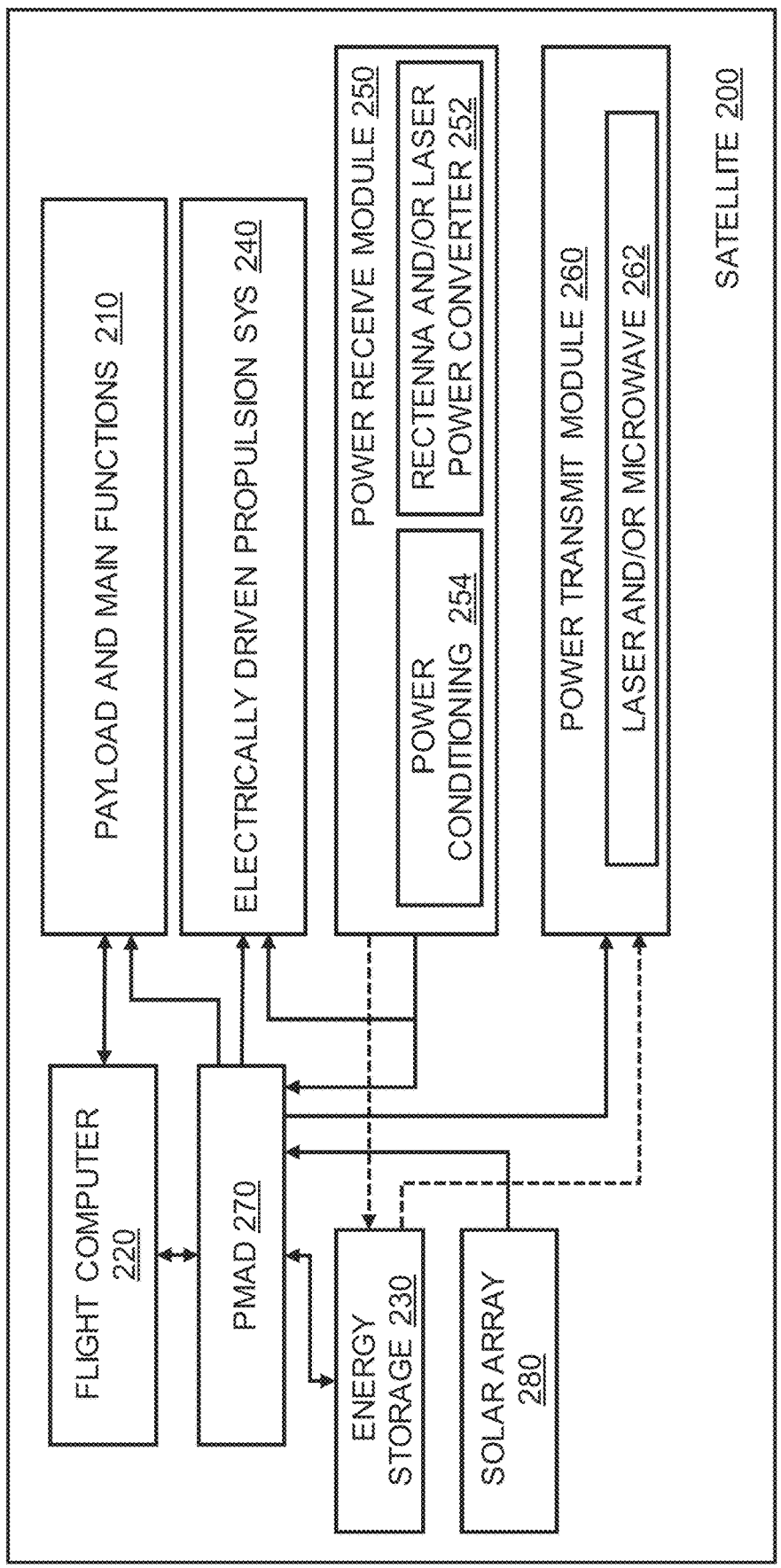
FIG. 2 depicts a simplified block diagram of a satellite according to an embodiment.

FIG. 2 depicts a simplified block diagram of a satellite according to an embodiment. Specifically, FIG. 2 depicts a satellite 200 suitable for use as any of the satellites 110 described above with respect to FIG. 1.

The satellite 200 of FIG. 2 is depicted as including a payload and main functions 210, controller 220, batteries 230, and electric-driven propulsion (EP) system 240, a power receiver module 250, a power transmitter module 260, a Power Management and Distribution (PMAD) system and a solar array 280.

The payload main functions 210 comprise the normal payload of the particular satellite, the main control and telemetry functions of the satellite and so on. The controller 220 may be included within the payload and main functions 210 or may be independent as depicted. Generally speaking, the controller 220 includes control circuitry necessary to perform the various tasks described herein with respect to the embodiments. The controller 220 may be implemented as a special purpose or general purpose computing device, such as depicted below with respect to FIG. 6.

The energy storage system (e.g. batteries) 230 comprise the primary electric source of the satellite and may be recharged via photovoltaic arrays 280 configured to capture solar radiation and the like as is known (e.g., routed directly or via the PMAD 270). The energy storage system 230 may also be configured to be recharged via energy/power received from the power receiver module 250 directly and/or via the PMAD 270. The energy storage system 230 provides energy/power to the power transmitter module 260 directly or via the PMAD 270. The solar array may provide energy/power to the power transmitter module 260 directly or via the PMAD 270.

The electric-driven propulsion (EP) system 240 generally comprises a system capable of generating some or all of the thrust necessary to move the satellite within the constellation of satellites. The EP system 240 may comprise any electric-driven space propulsion technology, which generally falls into three categories; namely, electrothermal, electrostatic, and electromagnetic. Suitable electric-driven space propulsion technologies include, illustratively, Hall Effect thrusters, gridded ion engines, high efficiency multistage plasma thrusters, pulsed plasma thrusters, resistojets, arcjets, field emission electric propulsion thrusters, electrospray/field emission thrusters, magnetoplasmadynamic thrusters and so on. Depending upon the EP system utilized, a variety of propellants can be used (e.g. xenon, iodine, etc.).

Various embodiments contemplate that power may be transferred from satellite to satellite within a satellite constellation using any of a variety of modes (e.g. laser, microwave). Various technologies can be used to transmit and receive the broadcasted power. Differing embodiments may be implemented to varying levels of advantage on various spacecraft sizes, operational requirements (payloads), and spacecraft bus components.

The power receiver module 250 depicted in FIG. 2 is configured to receive one or more power beams initially transmitted via one or more other satellites (e.g., a laser beam, microwave beam or some other type of broadcasted power beam) and convert the power of the received power beam(s) into electricity for use by EP system 240 to augment the thrust generated thereby, to help charge the batteries 230, and/or to provide electricity for other purposes of the satellite 200.

The power receiver module 250 includes a beam receiver such as a photovoltaic array for converting optical power into electricity, a rectenna for converting microwave power into electricity, and/or some other type of receiver 252 for converting beamed power into electricity. The power receiver module 250 optionally includes a power conditioner 254 suitable for use in conditioning the converted electricity into a form appropriate to the EP system 240 and/or batteries 230.

The power transmitter module 260 depicted in FIG. 2 is configured to transmit one or more power beams toward a target satellite, such as a satellite requiring additional electricity to augment its EP system thrust capability such as part of an orbital maneuver.

Figure 3:
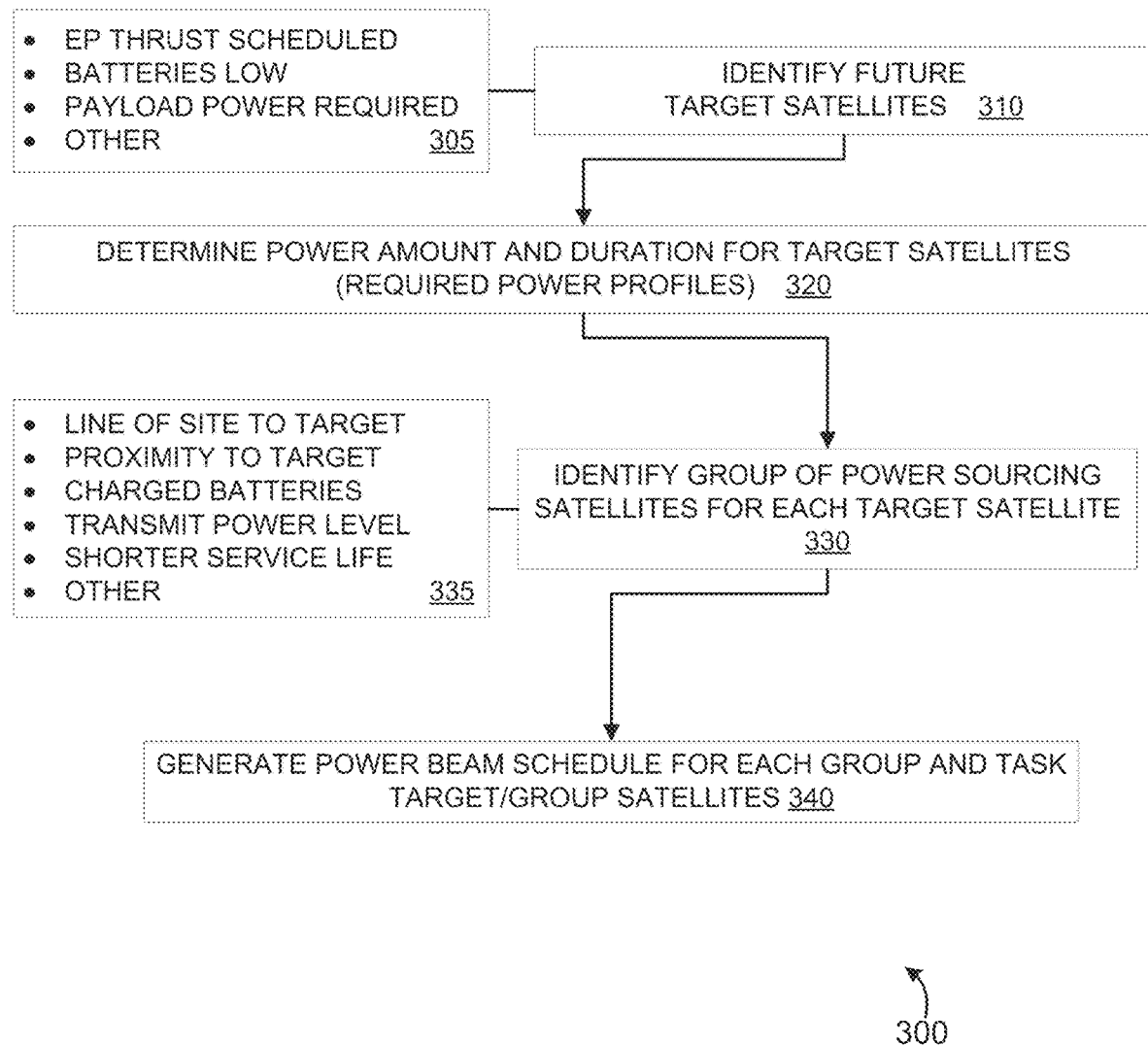
FIG. 3 depicts a method according to an embodiment.

FIG. 3 depicts a flow diagram of a method according to an embodiment. Specifically, the method 300 of FIG. 3 depicts a method of managing power transfer within a constellation of satellites such as described herein. The method 300 may be implemented at a ground station managing some or all of the satellites in a constellation, or at one more of the satellites within the constellation.

As previously noted, various embodiments provide a mechanism of equipping an entire constellation of satellites with power beaming and receiving capability to share power among members of a constellation of satellites in conjunction with electric propulsion. One aspect of the embodiments described herein is implementing the power beaming in a constellation of similarly sized satellites that are all equipped with power transfer capability and electric propulsion.

At step 310, future target satellite are identified. That is, referring to box 305, future target satellite comprise those satellites having a scheduled EP thrust or other high electricity demand operation, low batteries, and need for increased power for payload operation and/or other criteria pertaining to a future need for augmented power on board the target satellite.

At step 320, a determination is made for each identified target satellite as to the amount of power to be transferred to the target satellite and the duration of that power transfer process. That is, a determination is made as to how much power the target satellite needs to receive in the form of laser beam, microwave beam and the like, as well as the start and stop times of transmission of such power. In essence, a required power profile is determined for each target satellite. The required power profile lists power levels and time periods during which these power levels should be provided. This may comprise a fixed power level for a fixed amount of time, a varying power level over some period of time, different power levels at different periods of time and so on. The required power profile for a target satellite may be conceptualized or defined as total power transmitted to the satellite as a function of time.

At step 330, for each target satellite a respective group of power sourcing satellite is identified. That is, referring to box 335, membership in the group of power sourcing satellites may be determined in accordance with line of sight to the target satellite, proximity to the target satellite, whether or not the batteries of the power sourcing satellite are charged, the transmit power level capable of being provided by the power sourcing satellite, the service life of the power sourcing satellite and/or other criteria.

At step 340, a power beam schedule is generated for each group of power sourcing satellites associated with a target satellite. Specifically, the power beam schedule comprises an identification of power sourcing satellites selected to provide power for the target satellite at one or more predetermined times, the amount of power to be provided and so on. The power beam schedule for the group of power sourcing satellites associated with a target satellite is configured to cause those power sourcing satellite to provide power beams to their respective target satellites in a manner calculated to satisfy the required power profile associated with the target satellite. It is noted that power sourcing satellites need not provide power to the target satellite during the entirety of the time period associated with the upcoming power need of the target satellite. All that is necessary is that sufficient satellites at the appropriate times are scheduled to transmit respective beams of power (e.g., laser or microwave) toward the target satellite such that, in aggregate, the required power profile determined at step 320 with respect to the target satellite is achieved.

Generally speaking, a power beam schedule may be determined for a target satellite prior to a scheduled high electricity demand operation by the target satellite, the power beam schedule comprising at least an identification of power sourcing satellites selected to provide power for the target satellite at one or more predetermined times and an amount of power to be provided by the power sourcing satellites during the predetermined times. The predetermined times may comprise pre-operational time periods during which target satellite energy storage levels are increased via received power beam(s), operational time periods during which target satellite power used for high electricity demand operations is augmented by contemporaneously received power beans(s), and/or post-operational time periods during which target satellite energy storage levels are restored or otherwise replenished via received power beam(s).

Figure 4:
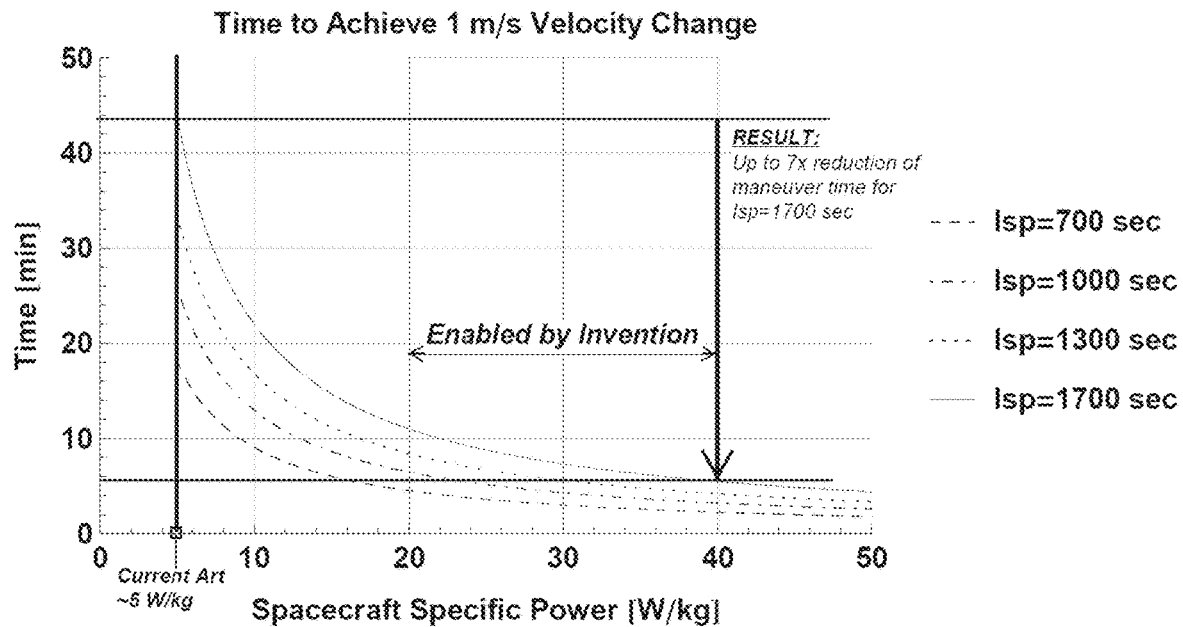
FIGS. 4-5 graphically depicts advantages that may be achieved in accordance with the various embodiments.

Advantageously, the various embodiments described herein provide a step increase in spacecraft specific power which enables a defined change in spacecraft orbital velocity to be achieved much more rapidly than with conventional approaches to electric-driven propulsion. FIG. 4 graphically depicts time (minutes) as a function of spacecraft specific power (W/kg) so as to illustrate the benefits of the various embodiments. For example, a satellite having an electric thruster with considerably higher propellant efficiency (Isp, specific impulse) can be used to achieve the delta velocity in a required time due to the higher spacecraft specific power. A highly efficient electric thruster (Isp=1700 sec) coupled with the current invention yields up to a 7× reduction in maneuver time versus prior art coupled with the same thruster.

Figure 5:
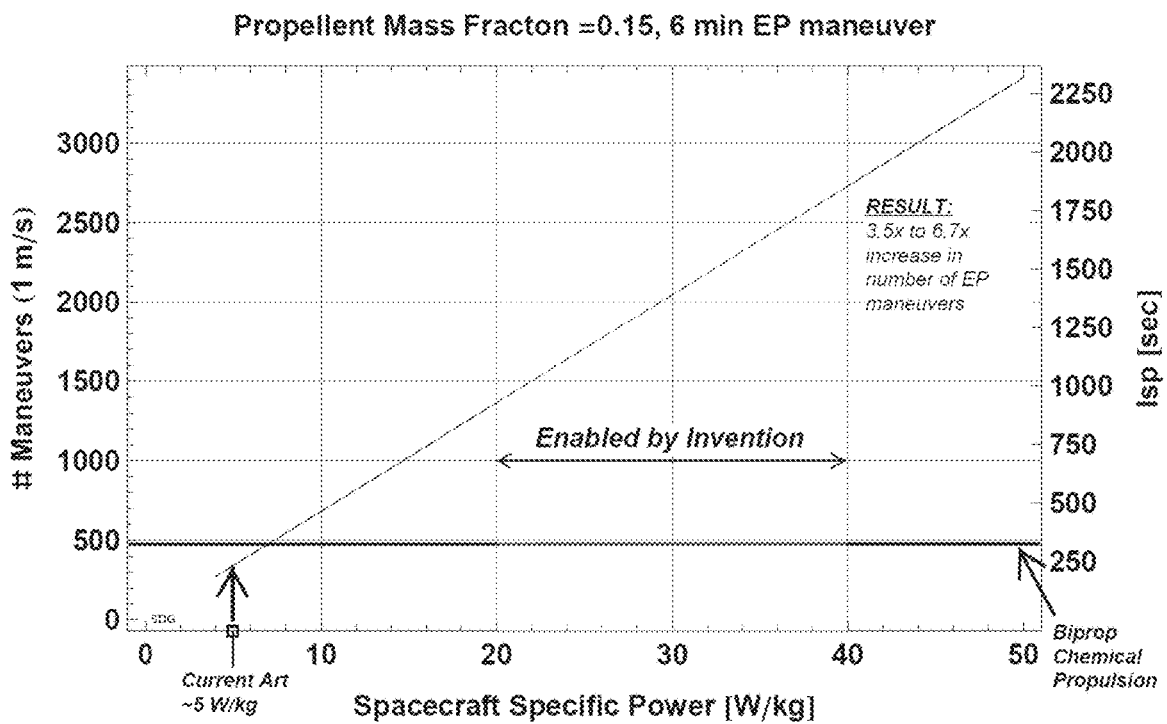

Further, the various embodiments described herein provide improved propellant efficiency which, in turn, translates into increased total delta velocity capability of the constellation. Increased total delta velocity capability enables longer constellation life and/or more operational capability. As an example, FIG. 5 depicts a number of 1 m/s maneuvers as a function of spacecraft specific power for an assumed time and spacecraft propellant mass fraction. It can be seen in FIG. 5 that the current invention offers up to a 6.7× increase in the number of maneuvers compared to prior EP art for a fixed maneuver time of 6 min.

Further, the various embodiments described herein provide an additional benefit in that they enable application of electric thrust at more optimal times during orbit transfer maneuvers, which increases the efficiency of propellant use (increases delta velocity capability). The increased acceleration potentially enables the spacecraft to accomplish desired orbit transfers in set prescribed times without continuously applying thrust. The prior art requires electric propulsion thrusting to be applied continuously to minimize transfer time. The approach required by prior art results in a suboptimum use of propellant, and the total delta velocity change capability of the satellite is negatively affected.

The various embodiments contemplate a constellation of like-sized satellites that all have the capability of beaming and receiving power (versus a small number of large power satellites outside of the constellation that beam power to satellites in another constellation with only receive capability). Equipping the entire constellation with beaming and receiving capability increases reliability (resiliency) of the constellation. It also operates to decrease costs through economies of scale.

Figure 6:
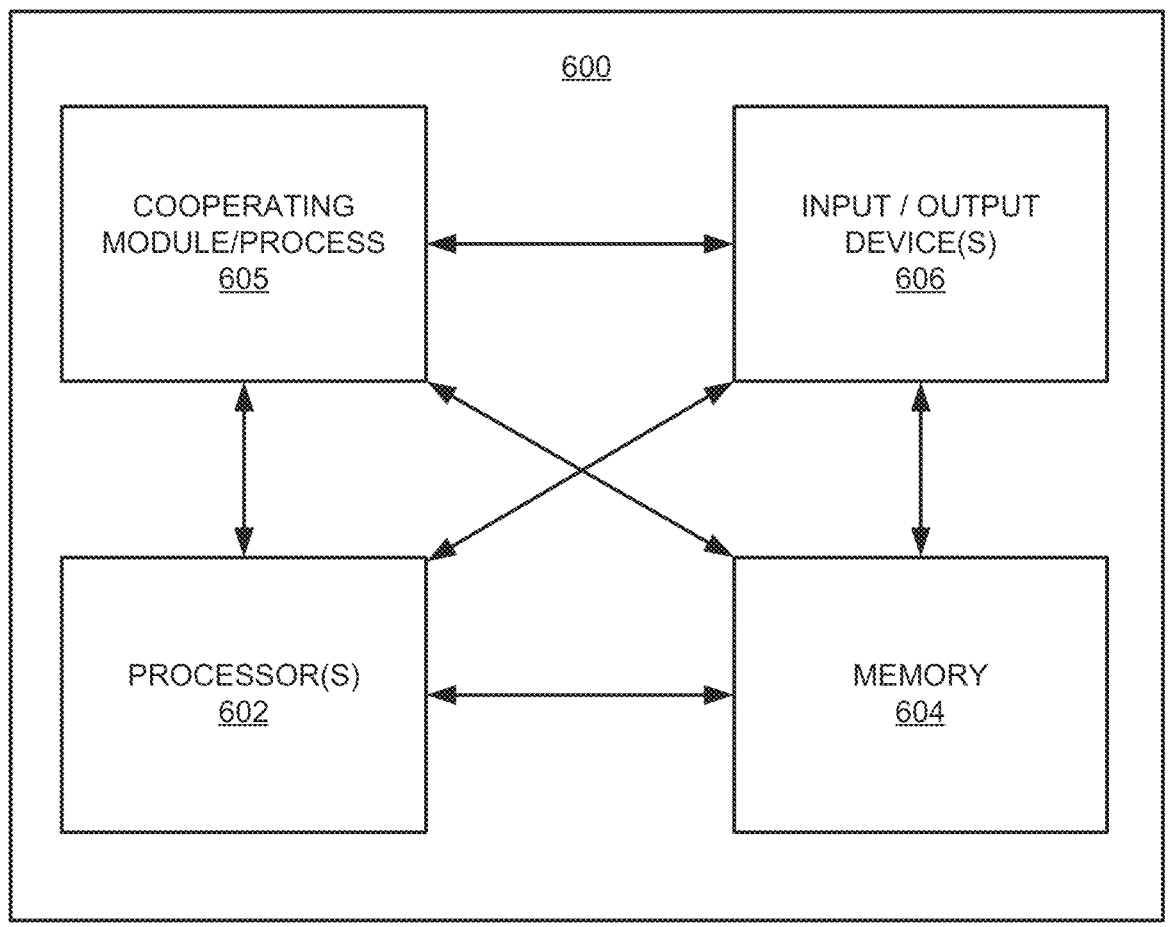
FIG. 6 depicts a high-level block diagram of a computing device suitable for use within the context of the various embodiments.

FIG. 6 depicts a high-level block diagram of a computing device, such as a controller in a satellite, ground station or spacecraft, suitable for use in performing functions described herein such as those associated with the various elements described herein with respect to the figures.

In particular, any of the various functional entities described herein, such as satellites, flight computers, ground stations, communications routing/management entities and so on (and/or portions thereof) as discussed within the context of the various embodiments may be implemented in accordance with a general computing device structure such as described herein with respect to FIG. 6.

As depicted in FIG. 6, computing device 600 includes a processor element 602 (e.g., a central processing unit (CPU) or other suitable processor(s)), a memory 604 (e.g., random access memory (RAM), read only memory (ROM), and the like), a cooperating module/process 605, and various input/output devices 606 (e.g., communications modules, network interface modules, receivers, transmitters and the like).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 605 can be loaded into memory 604 and executed by processor(s) 602 to implement the functions as discussed herein. Thus, cooperating process 605 (including associated data) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A system for sharing power within a constellation of earth orbiting satellites, comprising:
   a plurality of satellites forming the constellation of earth orbiting satellites, each satellite including a target driven electric propulsion (EP) system and a target power receiver for receiving power beams and converting received power beams into electricity for use by the target EP system to generate thrust, and each of the satellites also including a power transmitter for generating a power beam and transmitting the power beam, whereby each of the satellites forming the constellation of earth orbiting satellites can act as a target satellite and as a power sourcing satellite;
   when acting as a power sourcing satellite transmitting the power beam toward the target satellite; and
   when acting as a target satellite, the target satellite being capable of activating both the target EP system to generate EP thrust, and the target power receiver to receive and convert the power beam transmitted by the power sourcing satellite into electricity for use by the target EP system to generate thrust, and thereby augment the EP thrust, whereby
   power is shared between satellites within the constellation of earth orbiting satellites and the target satellite is maneuvered.

2. The satellite power sharing system of claim 1, wherein the power beam is comprised of a laser beam.

3. The satellite power sharing system of claim 1, wherein the target power receiver is comprised of a rectenna.

4. The satellite power sharing system of claim 1, wherein the power beam is comprised of a microwave power beam.

5. The satellite power sharing system of claim 1, wherein the target power receiver is comprised of a photovoltaic system.

6. The satellite power sharing system of claim 1, wherein the EP system is selected form a group consisting of a Hall Effect EP systems, an Ion drive EP system, and an Electrospray EP system.

7. The satellite power sharing system of claim 1, wherein:
   the target satellite is comprised of a plurality of the target satellites;

the power sourcing satellite is comprised of a plurality of power sourcing satellites; further comprising, a power beam schedule for the each of the target satellites prior to a respective scheduled EP thrust activation or other high electricity demand operation, the power beam schedule identifying for each of the target satellites, one or more power of the power sourcing satellites to provide power for the each of the target satellites; and one or more predetermined time periods for each of the power sourcing satellites to provide power to each of the target satellites.

8. The satellite power sharing system of claim 7, wherein the power beam schedule further comprises an amount of power for each of the power sourcing satellites to provide during the each of the predetermined time periods.

9. The satellite power sharing system of claim 7, further comprising:

the target satellites having respective energy storage systems and energy levels; wherein, the power beam schedule is calculated to recharge the target satellite energy storage systems prior to the respective EP thrust activations or the other high electricity demand operations, and augment the respective satellite energy levels during the respective EP thrust activations or other high electricity demand operations.

10. The satellite power sharing system of claim 7, wherein the power beam schedule includes a ranking of the power sourcing satellites according to battery life, expected battery demand, service life, proximity to the target satellites, and power level of the power beam, and also a ranking of the target satellites to provide necessary power to each of the target satellites.

11. The satellite power sharing system of claim 1, wherein each of the satellites within the constellation of earth orbiting satellites is of similar size and power level.

12. The satellite power sharing system of claim 1, wherein:

the power sourcing satellite is comprised of a plurality of power sourcing satellites; further comprising, a power beam schedule for the target satellite prior to a respective scheduled EP thrust activation or other high electricity demand operation, the power beam schedule identifying one or more power of the power sourcing satellites to provide power for the target satellite; and one or more predetermined time periods for each of the power sourcing satellites to provide power to the target satellite.

13. The satellite power sharing system of claim 12, wherein the power beam schedule further comprises an amount of power for each of the power sourcing satellites to provide during the each of the one or more predetermined time periods.

14. The satellite power sharing system of claim 12, further comprising:

the target satellite having an energy storage system and an energy level; wherein, the power beam schedule is calculated to recharge the target satellite energy storage system prior to the EP thrust activation or the other high electricity demand operation, and augment the respective satellite energy level during the EP thrust activation or other high electricity demand operation.

15. The satellite power sharing system of claim 12, wherein the power beam schedule includes a ranking of the power sourcing satellites according to battery life, expected battery demand, service life, proximity to the target satellite, and power level of the power beam.

* * * * *